UNITED STATES PATENT OFFICE 2,176,441

REMOVAL OF GASEOUS WEAK ACID FROM GASES CONTAINING THE SAME

Heinrich Ulrich and Reinhold Fick, Ludwigshafen-on-the-Rhine, and Hans Baehr and Wilhelm Wenzel, Leuna, Germany, assignors to I. G. Farbenindustrie Aktiengesellschaft, Frankfort-on-the-Main, Germany No Drawing. Application March 31, 1936, Serial No. 71,984. In Germany April 4, 1935

4 Claims. (Cl. 23—2)

The present invention relates to the removal of gaseous weak acids from gases containing the same.

It has already been proposed to remove gaseous weak acids from gases by treating them with alkaline-reacting washing liquids which may be regenerated by simple heating. Proposals for such washing liquids include for example organic bases, such as alkylolamines, alkylolimines and alkylenepolyamines which belong to a great variety of types. Bases of the said kind have the drawback that they always have a certain volatility and pass over, even if in only small amounts, with the steam usually employed for regeneration. An improvement on the said method is the use of alkaline-reacting salts of weak organic acids, especially salts of aminocarboxylic acids. These salts are practically non-volatile and have a stronger absorption power than the organic bases and than the alkali metal salts of weak inorganic acids which have also been proposed for gas purification. A slight drawback of these salts, as for example the aminocarboxylic acid salts, resides in the fact that when they have absorbed large amounts of gaseous weak acids, in particular carbon dioxide, they tend to form deposits of solid substances.

We have now found that in the purification of gases by means of alkaline-reacting washing liquids especially good results are obtained by employing solutions of salts of amino or imino acids or tertiary N-acids (all these are hereinafter briefly referred to as amino acids) which are derived from a primary, secondary or tertiary amine which contains at least two nitrogen atoms.

Substances of greatly different kinds are suitable as amino acids.

As already stated, the amines from which the acids are derived may be primary, secondary or tertiary amines. The simplest amines are those in which two or more nitrogen atoms are attached to one or two carbon atoms or in which several nitrogen atoms are connected with each other, as for example in hydrazine. The most important amines of this kind are ethylene diamine and its polymers, in particular diethylene triamine, triethylene tetramine and tetraethylene pentamine. As a rule those amines are most active which contain the least number of carbon atoms for each nitrogen atom; in some cases, however, longer carbon chains, such as are present in diaminopropane, diaminobutane or diaminopentane, offer advantages, for example when an especially slight volatility is desired or when solubility in non-aqueous liquids, as for example in oils is desired.

The acids may be derived from the said amino compounds in any manner. For example carboxylic acids may be used which are derived from monobasic acids of the aliphatic series, as for example acetic, propionic or butyric acid, or from dibasic or polybasic acids, as for example malonic acid, succinic acid or their homologues or tricarballylic acid, or from mono- or poly-hydroxy acids, as for example lactic acid, beta-hydroxy-butyric acid, tartaric acid or citric acid, or from keto acids, as for example pyroracemic acid, or from unsaturated acids, as for example maleic acid. Amino acids which already contain a simple or substituted amino group may also serve as the fundamental substances for the acids to be employed according to this invention. The acids may also be derived from aromatic compounds. In this case they may contain for example in the ring or in a side chain a COOH-group or even a sulphonic or other inorganic acid group. The said substances may also be derived from aromatic amines, the amino groups being present either in the ring or in a side chain or both. They may also be derived from hydroxy acids, as for example salicylic acid, or halogen acids, as for example chlorbenzoic acid. Moreover all these substances may contain two or more nuclei, as for example naphthalene or anthracene.

The acids may be quite generally derived from acyclic, isocyclic or heterocyclic compounds with one or more rings. Nitrogenous acids which correspond to one of the following formulae are especially suitable:

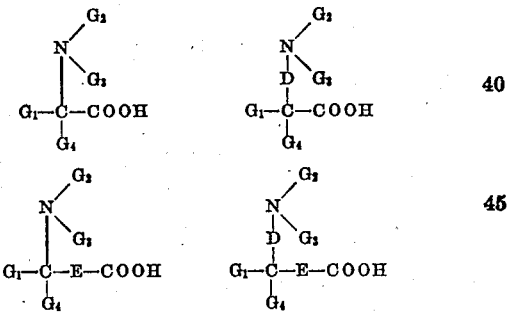

in which formulae $G_1$ and $G_3$ are hydrogen or hydrocarbon groups which may also contain a hydroxy or a primary, secondary or tertiary amino or a carboxylic group or two or more of these groups;

G₂ is a hydrocarbon group which may also contain a hydroxy or a primary, secondary or tertiary amino or a carboxylic group or two or more of these groups;

G₄ is a hydrogen or an aliphatic hydrocarbon group which may contain a hydroxy or a primary, secondary or tertiary amino or a carboxylic group or two or more of these groups, at least one of the groups G₁, G₂, G₃, G₄, containing one or more nitrogen atoms, and D and E are hydrocarbon groups which may also contain a hydroxy or a primary, secondary or tertiary amino or a carboxylic group or two or more of these groups. In the said compounds ring closure may occur in any way between the groups G₁, G₂, G₃, G₄, E and D.

According to this invention the said nitrogenous acids are employed in the form of their salts. All inorganic or organic bases may be used for the formation of the salts provided that the latter are not precipitated during the washing or the subsequent regeneration and thereby cause trouble. For example lead salts and other heavy metal salts should not be used if hydrogen sulphide is to be washed out because sulphides would be precipitated and would not pass into solution again when heated. Salts for example of weak inorganic or organic bases, as for example of magnesium or zinc, may be employed. Generally speaking, however, it is preferable to employ salts of the strongest possible bases. Especially suitable for this purpose are the alkalies and alkaline earths, in particular potassium or sodium, but strong organic bases, in particular those containing several nitrogen atoms, as for example tetramethylammonium hydroxide, ethylene diamine or ethanolamine are also suitable. When the acids contain more than one acid group, the bases combined to the single acid groups may be different; for example potassium and sodium may alternate with each other or an inorganic base may alternate with an organic base or different organic bases may alternate. When organic bases are employed for the formation of salts, in some cases a ring closure may take place between these bases and the acids.

The manifold manner in which the substances to be used according to this invention may be varied may be seen from the following table which sets out some suitable salts, mainly those derived from the simplest members of the fatty acid series and ethylene diamine and its polymers:

1. Gamma-hydroxyethylamino-alpha-diethylenetriamino-butyric acid potassium salt:

HO—C₂H₄—NH—CH₂—CH₂—CH—COOK
                              |
                              NH—C₂H₄—NH—C₂H₄—NH₂

2. Alpha-propylenediamino-epsilon-aminocaproic acid sodium salt:

NH₂—CH₂—CH₂—CH₂—CH₂—CH—COONa
                          |
                          NH—C₃H₆—NH₂

3. Potassium-sodium salt of alpha.alpha'-(triethylenetetramino)-dipropionic acid:

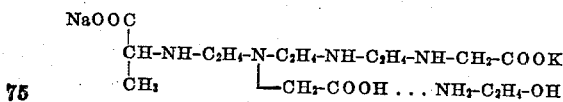

4. Potassium-sodium-monoethanolamine salt of triethylenetetramino-alpha-propionic acid diacetic acid:

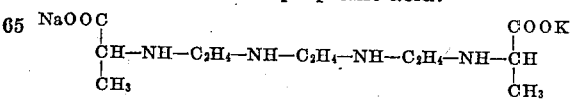

5. Potassium-sodium salt of methylenediamino-diacetic acid:

NaOOC—CH₂—NH—CH₂—NH—CH₂—COOK

6. Alpha-diethylenetriamino-propionic acid sodium salt:

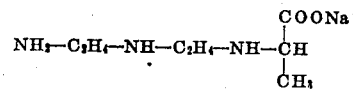

7. Diethylenetriamino-acetic acid potassium salt:

NH₂—C₂H₄—NH—C₂H₄—NH—CH₂—COOK

8. Triethylenetetramino-succinic acid sodium salt:

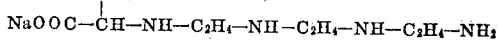

9. Methylenediamine-acetic acid potassium salt: NH₂—CH₂—NH—CH₂—COOK.

10. Ethylenediamino-acetic acid barium salt:

NH₂—C₂H₄—NH—CH₂—COO—
   Ba—OOC—CH₂—NH—C₂H₄—NH₂

11. Sodium-calcium salt of tetraethylenepentamino-citric acid:

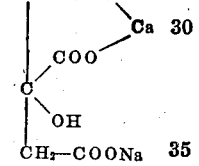

12. Sodium-potassium salt of ethylenediamino-malic acid:

KOOC—CH—OH
        |
NaOOC—CH—NH—C₂H₄—NH₂

13. Triethylenetetramino-diacetic acid sodium salt:

NaOOC—CH₂—NH—C₂H₄—NH—C₂H₄—
        NH—C₂H₄—NH—CH₂—COONa

14. Diethylenetriamino-triacetic acid sodium salt:

NaOOC—CH₂—NH—C₂H₄—N—C₂H₄—NH—CH₂—COONa
                       |
                       CH₂COONa

15. Ethyl-ethylenediamino-diacetic acid sodium salt:

NaOOC—CH₂—N—C₂H₄—NH—CH₂—COONa
              |
              C₂H₅

16. Triethylenetetramino-acetic acid sodium salt:

NH₂—C₂H₄—NH—C₂H₄—NH—
        C₂H₄—NH—CH₂—COONa

17. Mono-sodium salt of N-(beta-hydracrylic acid)-N'-(ethyl)-N'-(aminoacetic acid)-hydrazine:

HO—CH—CH₂—COONa
    |
    NH
    |
C₂H₅—N—CH—COOH
         |
         NH₂

18. Diethylene-triamino-oleic acid potassium salt:

NH₂—C₂H₄—NH—C₂H₄—NH—
    (CH₂)₈—CH=CH—(CH₂)₇—COOK

19. Para-diethylenetriamino-benzoic acid potassium salt:

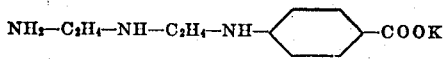

20. (Ethylenediamino)-hydroxyacetic acid potassium salt: NH₂—C₂H₄—NH—O—CH₂—COOK.
21. Beta-methylenediamino-lactic acid sodium salt: NH₂—CH₂—NH—CH₂—CH(OH)—COONa.
22. Ethylenediamino-beta-methylamino-hydracrylic acid sodium salt:

NH₂—C₂H₄—NH—CH₂—NH—
CH(OH)—CH₂—COONa 23. 3-(diethylenetriamino)-anthracene-2-carboxylic acid sodium salt:

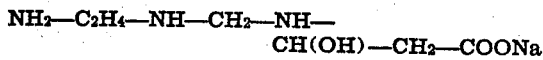

24. Benzylamine salt of ethylenediamino-acenaphthene carboxylic acid:

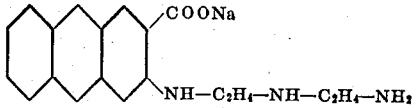

25. Ethylenediamine salt of para-triethylenetetraminoanthranilic acid:

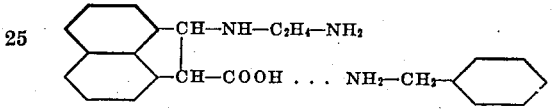

26. Diethylenetriamino-terephthalic acid:

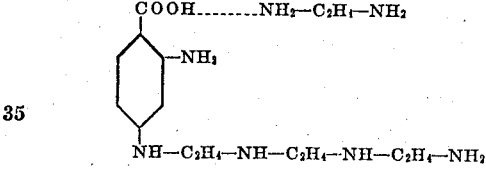

27. Diethylenetriamino-cyclopentane-carboxylic acid sodium salt:

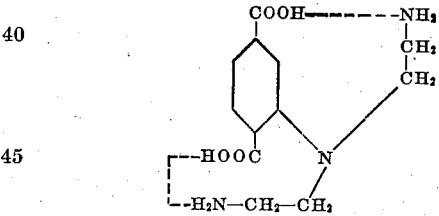

28. Compound formed by ring closure while splitting off water from the diethanolamine salt of ethylenediamino-cumalic acid:

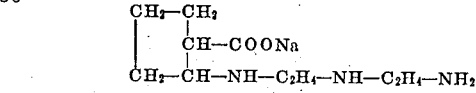

29. Potassium salt of N-dimethyl-N'-methyldiamino-isopropanol-N'-acetic acid

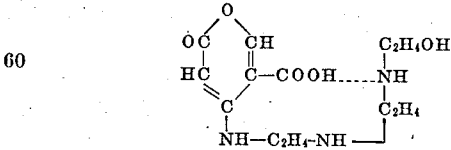

Substances may also be employed in which hydrogen atoms are no longer attached to the nitrogen atoms, but only alkyl groups and the like. They may be obtained by synthesis while selecting suitable initial materials or by subsequent conversion of the non-substituted compounds, as for example methylation by known methods.

The single chemical individuals may be used as such or in admixture with each other. They may also be employed in admixture with other washing agents, especially solutions of organic bases and/or basic-reacting salts of other acids. Thus, in addition to the substances according to this invention there may also be present simultaneously in the solution basic-reacting salts of simple organic acids or tertiary potassium phosphate, potassium metaborate and similar basic-reacting substances.

By reason of the large number of substances capable of employment according to this invention, solutions of any desired basic character may be prepared and fine gradations in the basicity of the solutions obtained in any desired manner. Thus, by selection of the different components it is possible to increase or decrease the basicity and to vary the absorptive power of the solutions for the gaseous weak acids in the desired manner. For example, when starting from the stronger polybasic hydroxyacids, as for example tartaric and citric acids, solutions having a weaker basic reaction can be obtained than when starting from an amino-acid, such as alanine, and employing the same amines and the same salt-forming bases. Alkaline earth metal salts have a weaker basic reaction than alkali metal salts and the remaining salts of inorganic bases are weaker than the alkaline earth metal salts. Moreover, the choice of an aromatic acid, especially of a polynuclear acid, lessens the basic character of the solution. These differences between the different substances may be of importance when gaseous weak acids of different strengths are to be separated from each other by washing. Thus for example in the case of a smoke-gas mixture which contains sulphur dioxide and carbon dioxide, a solution of weakly basic character absorbs only sulphur dioxide while the carbon dioxide leaves it unchanged as a gas and may then be removed by means of a more strongly basic solution in a second washing.

The concentrations of the washing liquids may be as desired and depend mainly on the optimum washing conditions for the gas concerned. As a rule, concentrations of from 25 to 40 per cent are the most favorable. Favorable actions may also be obtained, however, with lower concentrations in the case of difficultly soluble substances and with higher concentrations in the case of readily soluble substances. The concentrations may also be selected having regard to the material of the apparatus in order to exclude attack on the material of the apparatus which may occur within certain ranges of concentration. Thus for example apparatus constructed of aluminium or aluminium alloys may usually be employed, if the concentration of the solution is at least 20 percent and if care is taken that the solution is free from dissolved aluminium compounds.

Practically all industrial gases may be purified from gaseous weak acids according to this invention. Among these may be mentioned in particular distillation gases of coals and the like (as for example coke-oven gases, illuminating gas or low temperature carbonization gas), natural gases, gas mixtures such as are formed by the conversion of coals or hydrocarbons with air, oxygen or steam (as for example producer gas or watergas), gases derived from the thermal splitting of hydrocarbons (as for example cracking gases), waste gases from destructive hydrogenations and also smoke gases and other combustion gases. Gases which contain ammonia in addition to gaseous weak acids may also be washed by means of the washing agents according to this invention, whereby in some cases the ammonia may also be wholly or partly absorbed by the washing agent.

The apparatus in which the washing of the gas is carried out may be of any suitable construction. For example washing towers which may have any desired filling, or mechanically moved washers, such as disintegrators, Feld washers or Ströder washers, may be employed. The period within which the gases are in contact with the washing liquid and the other conditions of the washing, as for example the amount of solution, the distribution of the solution and the temperature, must depend on the nature of the gas to be washed. For the washing out of hydrogen sulphide, only a very short period of contact is usually necessary while the washing out for example of carbon dioxide requires a considerably longer period of contact. In this manner the two gases may be washed out to a large extent separately from each other when this is necessary.

For the removal of carbon dioxide it is also advantageous to keep the solution at elevated temperature, preferably between 45° and 55° C. In addition to a more rapid absorption, there is the advantage that during each circulation of the solution the heating up to this temperature is dispensed with.

The pressure under which the gases are washed may vary within wide limits. If the gases are already under increased pressure, a washing at that pressure is naturally of special advantage. Although gases at atmospheric pressure may be subjected to a change in pressure for the washing, the washing of the gases under the prevailing pressure is generally speaking the most economical method.

For the regeneration of the washing liquids it is preferable to make use by heat exchangers of the heat content of the effluent hot solution. The regeneration may be carried out in any desired way and all known methods may be employed. All known apparatus, such as towers and expelling columns, may be employed. The regeneration of the solution may be further promoted by a rapid withdrawal of the gases evolved, as for example by leading in counter-current to the trickling solution steam or a pure gas, as for example nitrogen. The expelling of the gases may also be carried out or assisted by the vapors of organic substances, such as chlorine derivatives of paraffin hydrocarbons or benzene. Furthermore, in order to expel the last traces of an absorbed gas from a solution, for example another gas may be led in counter-current, as for example carbon dioxide, which itself is absorbed to a certain extent. Any desired source of heat may serve for heating the solution, as for example direct or indirect heating with steam, including waste steam, direct firing, hot gases such as combustion gases, or other hot media. The pressure during the regeneration may be selected as desired. In the case of gaseous acids which are only expelled with difficulty, it is preferable to expel them under pressure because in this way the boiling point of the solution is increased and a more rapid splitting off of the gaseous weak acids is effected. They may also be expelled at reduced pressure and corresponding reduced temperature. In order to retain any traces of basic washing agent carried along, it is preferable to provide for a good stripping of the effluent vapors and to return any basic substances carried along to the washing liquid.

As solvents for the substances employed according to this invention may be mentioned both aqueous and non-aqueous media. Non-aqueous and non-hydrating solvents may be used for special effects, for example for the simultaneous washing out of gaseous weak acids and readily volatile organic compounds, as for example benzene, from gases. Any desired mixture of non-hydrating solvents may be employed.

The apparatus serving for the washing and for the regeneration are preferably constructed of metals which are readily available. In many cases it is preferable to line the apparatus with mortar, acid-proof bricks and cement or wood lagging, in order to provide an increased protection of the metal, especially also against mechanical influences. Generally speaking iron apparatus may be employed, especially when washing out hydrogen sulphide which apparently exerts a certain protective action on the material of the apparatus. In other cases aluminium may be used with advantage. Alloys known in commerce, as for example V2A steel or aluminium silicon alloys, for example that known under the registered trade mark "Silumin", may also be employed.

A special advantage of the process according to this invention resides in the fact that deposits of solid substances do not take place, or only take place to a very slight extent, during the washing of the gas or during the regeneration of the washing liquids so that no stoppages or other mechanical troubles need be feared in the apparatus even when the washing liquids are strongly laden with hydrogen sulphide, carbon dioxide or hydrocyanic acid. A further advantage is the high absorptive capacity of the solutions which is partly attributable to the fact that the solutions are of lower viscosity and greater mobility and may therefore be employed in comparatively high concentrations. Thus for example diethylene-triamine-triacetic acid may be employed in a 45 per cent solution.

The following examples will further illustrate the nature of this invention but the invention is not restricted to these examples.

*Example 1*

A washing apparatus contains a 45 per cent aqueous solution of diethylenetriamino-diacetic acid sodium salt which has been regenerated by strong boiling (specific gravity 1.255). If 300 liters of a brown coal destructive hydrogenation waste gas containing 8.5 per cent of $H_2S$ (122 grams per cubic meter) and 1.46 per cent of $CO_2$ be passed per hour per liter of solution through the apparatus at 20° C., about 98 per cent of the $H_2S$ and about 72 per cent of the $CO_2$ are washed out from the gas in the first hour. The solution can be regenerated in known manner by simple heating.

*Example 2*

For the purpose of washing a gas containing 7 per cent of hydrogen sulphide, a washing apparatus is used in which the gas bubbles through the stationary solution in the form of extremely fine bubbles. 1 cubic meter of a 42 per cent aqueous solution of diethylenetriamino-diacetic acid sodium salt-monoacetic acid potassium salt (specific gravity 1.220) is used and washing is carried out with a gas speed of 300 cubic meters per hour, the hydrogen sulphide being washed out. When the absorptive power of the solution has been exhausted, it may be regenerated in known manner by heating.

Example 3

A gas containing 5 per cent of carbon dioxide is freed from the same by washing in a washing apparatus as described in Example 2. The washing liquid is a 30 per cent aqueous solution of tri-ethylenetetramino-diacetic acid sodium salt having a specific gravity of 1.20. When 1 cubic meter of well boiled solution is used and the throughput of gas is 300 cubic meters per hour, the carbon dioxide is removed at an absorption temperature of 20° C. The regeneration of the washing liquid is effected by simple heating while blowing in steam.

Example 4

An industrial washing plant having a washing space of 1.96 cubic meters is operated with a 40 per cent aqueous solution of triethylenetetramino-acetic acid potassium salt (specific gravity 1.41). The gas to be washed contains 28.2 per cent of $CO_2$. The washing tower is trickled with 1.5 cubic meters of solution per hour at a temperature of 50° C. while there are led in counter-current to the trickling solution 168 cubic meters of gas per hour, the latter being purified to a final content of 0.5 per cent of $CO_2$. The trickling in the lower third of the washing tower is stronger, the solution which has already flowed through the tower being pumped in in an amount of 10 cubic meters per hour. By this arrangement, the solution already half-saturated in the upper part of the washing tower is brought into contact with fresh gas rich in carbon dioxide whereby it is saturated to the highest possible extent. It passes, laden with 52.7 volumes of $CO_2$ per volume of solution, through the heat exchanger into the boiler where it is regenerated. It leaves the boiler with a gas content of 21 volumes of $CO_2$ per volume of solution and is returned for further washing of the gas.

Example 5

In the apparatus described in Example 2 a gas containing 5 per cent of carbon dioxide is freed from the latter. A 30 per cent aqueous solution of dimethyl-ethylenediamino-hydroxypropane carboxylic acid sodium salt corresponding to the formula

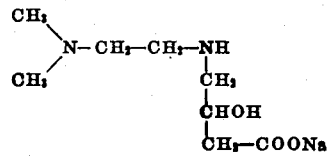

is used as the scrubbing liquid. When using 1 cubic meter of strongly boiled solution and passing through 300 cubic meters of gas per hour at 20° C., the carbon dioxide is removed from the gas practically completely. The spent scrubbing liquid is regenerated by heating while introducing steam.

Similar results are obtained by using a solution of the salt corresponding to the formula

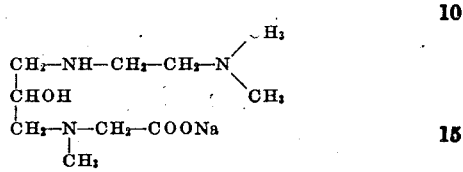

Example 6

A combustion gas containing sulphur dioxide is acted upon in a scrubbing tower with a 30 per cent aqueous solution passed in counter-current to the gas, of tri-hydroxyethyl-ethylenediamino-acetic acid potassium salt corresponding to the formula

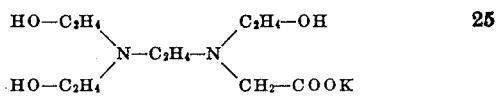

Each liter of the solution takes up 40 liters of sulphur dioxide which can be expelled by heating the solution to boiling. The gas is freed from sulphur dioxide practically completely.

What we claim is:

1. The process for removing a weak gaseous acid from a gas containing the same which comprises scrubbing said gas with a solution the essential constituent of which is a salt of a base, selected from the group consisting of the alkalies, alkaline earths and the strong organic bases, with an amino carboxylic acid containing at least two nitrogen atoms and derived from an amine selected from the group consisting of ethylene diamine and its polymers, said salt having an alkaline reaction.

2. The process as claimed in claim 1, in which the amino-carboxylic acid is derived from di-ethylene-triamine.

3. The process as claimed in claim 1, in which the amino-carboxylic acid is derived from tri-ethylene-tetramine.

4. The process as claimed in claim 1, in which the amino-carboxylic acid is derived from tetra-ethylene-pentamine.

HEINRICH ULRICH.
REINHOLD FICK.
HANS BAEHR.
WILHELM WENZEL.